United States Patent
Takaki et al.

[11] Patent Number: 5,313,978
[45] Date of Patent: May 24, 1994

[54] VENTILATION LINE OPENING/CLOSING MEANS OF FUEL TANK

[75] Inventors: Hiroshi Takaki; Shinya Shimada, both of Soja, Japan

[73] Assignee: Om Industrial Co., Ltd., Okayama, Japan

[21] Appl. No.: 114,330

[22] Filed: Aug. 30, 1993

[30] Foreign Application Priority Data

Aug. 31, 1992 [JP] Japan .................. 4-232005

[51] Int. Cl.⁵ .............................................. F16K 17/36
[52] U.S. Cl. .................................. 137/43; 123/514; 123/516; 137/588
[58] Field of Search ............... 123/514, 516; 137/587, 137/588, 43

[56] References Cited

U.S. PATENT DOCUMENTS

| | | | |
|---|---|---|---|
| 4,811,718 | 3/1989 | Sonoda | 137/588 X |
| 5,044,389 | 9/1991 | Gimby | 137/39 |
| 5,044,397 | 9/1991 | Szlaga et al. | 137/587 |
| 5,050,567 | 9/1991 | Suzuki | 123/514 |
| 5,065,782 | 11/1991 | Szlaga | 137/39 |
| 5,156,178 | 10/1992 | Harris | 137/43 |

*Primary Examiner*—Robert G. Nilson
*Attorney, Agent, or Firm*—Koda and Androlia

[57] ABSTRACT

An object of the invention is to improve a ventilation line opening/closing means of a fuel tank which interrupts a ventilation line from the fuel tank to a canister during fuel supply so as to restrict the fuel level when the tank is full, and which opens the ventilation line during traveling of a vehicle. This invention provides a ventilation line opening/closing means of a fuel tank, comprising a float valve provided in a ventilation line for introducing gas of the fuel tank into a canister so as to control ventilation, wherein a fuel receiving portion of return fuel including escape holes is integrally formed on a lower portion of a vent shut-off valve, so that the vent shut-off valve is opened by return fuel from the engine during operation of the engine, and that the vent shut-off valve is closed by the force of a spring during a stop of the engine.

3 Claims, 9 Drawing Sheets

VENTILATION LINE OPENING/CLOSING MEANS OF FUEL TANK

BACKGROUND OF THE INVENTION

1. Industrial Field of the Invention

The present invention relates to a ventilation line opening/closing means of a fuel tank which interrupts a ventilation line to a canister during fuel supply so as to restrict the fuel level when the tank is full (to prevent overfilling), and which opens the ventilation line during traveling of a vehicle.

2. Description of the Prior Art

Prevention of diffusion of automobile fuel into the atmosphere concerns the recent regulations for preventing air pollution, and is an important issue.

In a fuel tank of an automobile, vaporization of liquid fuel is activated by, for example, an increase in temperature, and accordingly, an internal pressure of the tank is increased. As the pressure becomes higher, there is more risk that fuel vapor will leak to the environment due to penetration or outflow, which results in air pollution as well as fuel loss. Moreover, when the tank internal pressure is high, there is more danger of a fire accident at the time of collision.

In order to release excessive fuel vapor into the canister, the resistance of the ventilation line is decreased to prevent the tank internal pressure from increasing. On the basis of this idea, various kinds of fuel vapor discharge valves and tank internal pressure control apparatus have been suggested, for example, as disclosed in U.S. Pat. Nos. 5,044,389, 5,044,397 and 5,065,782.

SUMMARY OF THE INVENTION

With the above-described valves and apparatus, however, restriction of the fuel level when the tank is full can not be performed during fuel supply. In order to carry out the fuel level restriction, the ventilation line to the canister is closed or the resistance of the ventilation line is increased. Moreover, if the resistance of the ventilation line to the canister is small, there is a risk that liquid fuel will flow into the canister when the vehicle body rolls during traveling.

On the contrary, when the ventilation line to the canister is closed for the fuel level restriction, the tank internal pressure is raised, and there is a risk that liquid fuel will jet back from the side of a fuel filling port immediately after the fuel supply. The present invention has been achieved to solve the problems which are contradictory to each other.

As a result, the following means has been developed as a means which controls a tank internal pressure, i.e., which discharges fuel vapor and decreases the tank internal pressure by timely opening/closing operation of a ventilation line, so as to prevent the breakage of associated devices and the outflow of liquid during fuel supply so as to perform the fuel level restriction. More specifically, it is a ventilation line opening/closing means of a fuel tank, comprising a float valve provided in a ventilation line for introducing gas of the fuel tank into a canister so as to control ventilation, wherein a spring is provided to close a vent shut-off valve during a stop of an engine, and a fuel receiving portion of return fuel including escape holes of return fuel is integrally formed on a lower portion of the vent shut-off valve, so that the vent shut-off valve is opened by return fuel from the engine during operation of the engine, and that the vent shut-off valve is closed by the force of the spring during a stop of the engine.

In this means, the escape holes of return fuel are designed to have such dimensions that liquid fuel of a smaller amount than an amount of liquid fuel which returns from the engine side leaks through these holes. The float valve body comprises a seal surface which abuts against a valve seat of a valve casing, the seal surface being an outer surface of an upper portion of the vent shut-off valve in the form of a conical tube, a check valve provided inside, and a vertical communication hole formed in the axial center.

Further, the valve body includes a valve seat provided on that side of a check valve which is far from the outer surface of the conical tube, and a roll-over type valve which abuts against the valve seat to constitute a valve portion is provided below the valve seat.

According to the present invention, while the engine is being operated, the amount of return fuel which accumulates in the fuel receiving portion formed in the vent shut-off valve is larger than the amount of liquid fuel which escapes from the escape holes, so that the vent shut-off valve is pressed downwardly by the weight of the return fuel, thereby opening the ventilation line.

When the engine is stopped, the return fuel which has accumulated in the fuel receiving portion stops dropping through the escape holes, so that the vent shut-off valve becomes light and is pressed upwardly by the spring. Thus, the ventilation line is closed to perform the fuel level restriction.

When the fuel surface sways while the ventilation line is open, a float mechanism of the vent shut-off valve prevents liquid fuel in the tank from flowing into the canister via the ventilation line. In this manner, the valve body also functions as a float valve.

When the tank internal pressure is raised abnormally while the ventilation line is closed (e.g., when the surface of the liquid fuel is lower than the valve casing and the temperature starts to increase during parking of the vehicle), the ventilation line is opened by the check valve which is incorporated in the vent shut-off valve, so that a pressure increase in the tank can be suppressed. This check valve functions as a so-called gas-venting relief valve.

When the tank internal pressure is lowered abnormally while the ventilation line is closed (e.g., when the temperature starts to decrease during parking of the vehicle), the vent shut-off valve itself is pressed downwardly, withstanding the pressing force of the spring, so that the ventilation line is opened to prevent an abnormal negative pressure in the tank.

Under special circumstances, for example, in the case of fuel supply during operation of the engine (abnormal fuel supply) which is not usually conducted, when the fuel level is raised by fuel supply, the vent shut-off valve is moved upwardly owing to the float mechanism so as to close the ventilation line to the canister, and consequently, the fuel level restriction can be performed. Further, in this state, when the cap of the fuel filling port is closed, the tank internal pressure is increased by such an influence as return fuel of a high temperature. The check valve is opened under a pressure higher than a predetermined level and discharges fuel vapor of the tank into the canister, and at the same time, the check valve draws liquid fuel of the tank into the float valve body. The drawn liquid fuel weakens the float mechanism of the float valve body, so that the vent shut-off valve is moved downwardly, thus opening the ventilation line to the canister.

When the vehicle is turned over, it is necessary for the roll-over valve to function to press the vent shut-off valve upwardly, thereby quickly closing the ventilation line to the canister. The ventilation line opening/closing means according to the present invention is constructed to close the ventilation line by operating the valve with quick responsiveness and reliability in order to prevent liquid fuel in the tank from leaking and flowing into the canister especially via the ventilation line when the vehicle slalom-drives or is turned over. Also, when the vehicle recovers the normal position, the valve is quickly operated by return fuel from the engine which is being operated, so as to open the ventilation line. Thus, the safety of the fuel tank and the operational reliability can be enhanced by opening/closing the ventilation line with accurate timing.

BRIEF DESCRIPTION OF THE DRAWINGS

FIGS. 1 to 9 are views for explaining one embodiment in which a ball is used for operating a roll-over type valve:

FIGS. 10 to 14 are views for explaining one embodiment in which a float is used for operating a roll-over type valve:

DETAILED DESCRIPTION OF THE INVENTION

Figure 1:
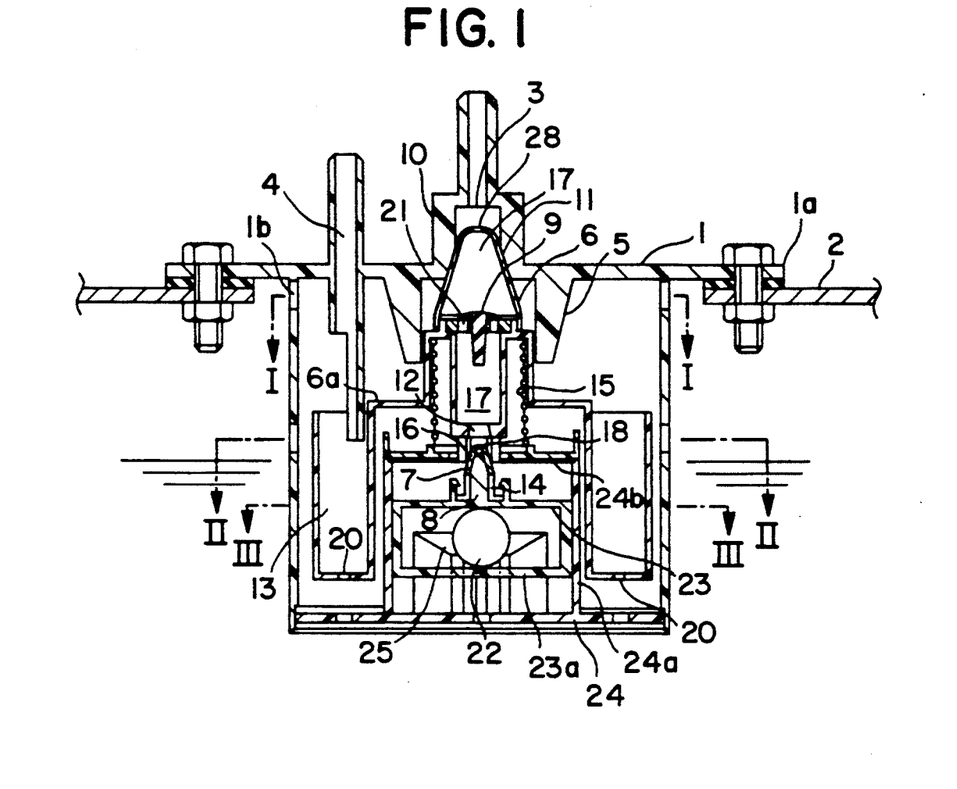
FIG. 1 is a cross-sectional view showing a ventilation line opening/closing means of a fuel tank in this embodiment.
Figure 2:
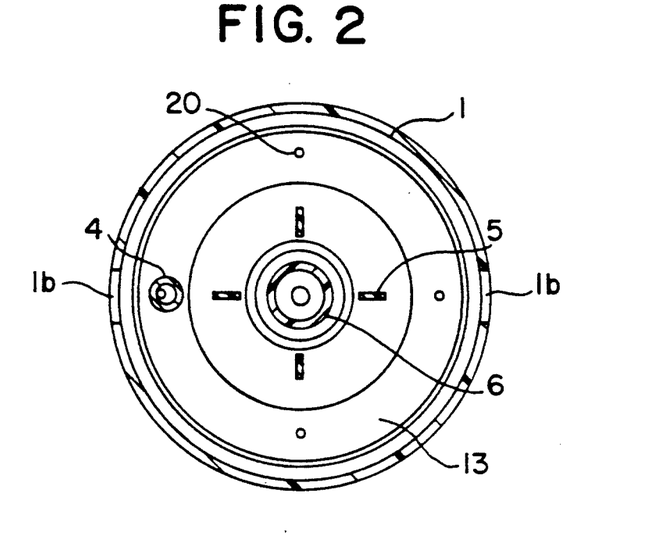
FIG. 2 is a cross-sectional view taken along the line I—I in FIG. 1.
Figure 3:
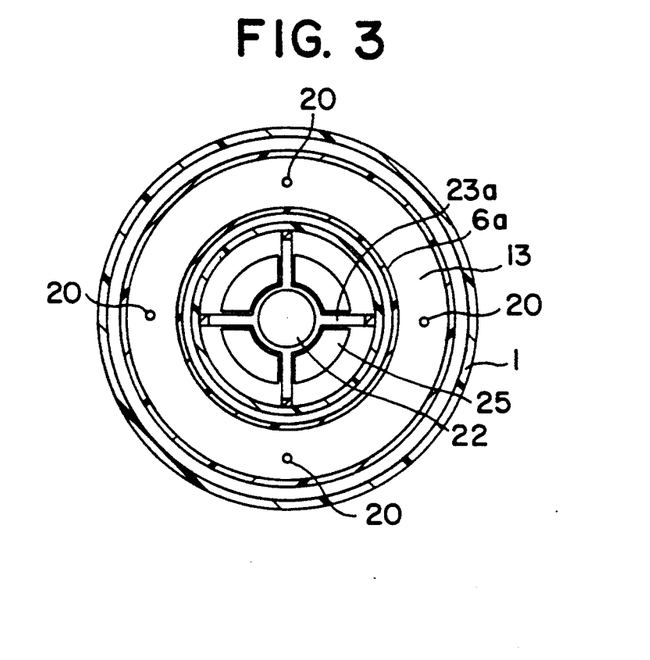
FIG. 3 is a cross-sectional view taken along the line III—III in FIG. 1.
Figure 4:
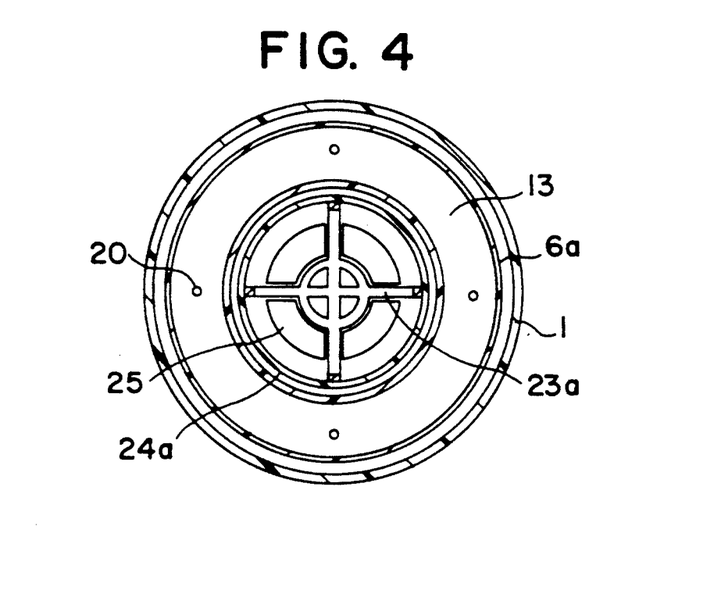
FIG. 4 is a cross-sectional view taken along the line III—III in FIG. 1, with the ball being removed.
Figure 5:
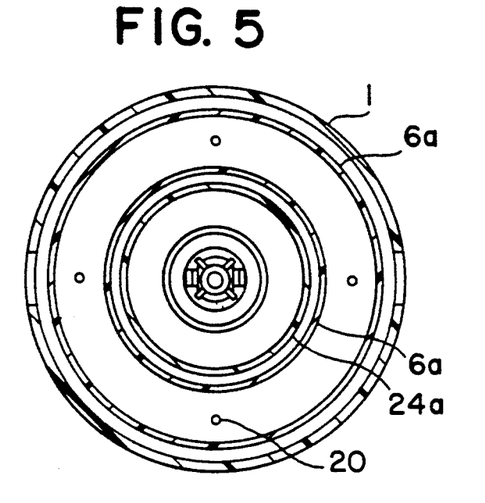
FIG. 5 is a cross-sectional view taken along the line II—II in FIG. 1.

FIGS. 1 to 9 show one embodiment of a ventilation line opening/closing means in which a ball is used for a roll-over type valve for closing a ventilation line from a tank to a canister, for example, when a vehicle is turned over. The ball detects an inclination of the vehicle and moves. As shown in FIG. 1, this means is installed on a ventilation line on an upper wall of a fuel tank 2 by means of a flange portion 1a formed on the outer periphery of a cylindrical valve casing 1.

The cylindrical valve casing 1 is closed except for an upper vent hole 3, a return-passage hole 4, a vent hole 1b formed in an upper portion of a side wall, and a vent hole formed in a bottom casing 24. The vent hole 3 communicates with the ventilation line for releasing fuel vapor from the tank to the canister. The return-passage hole 4 is designed such that return fuel returning from the engine side can pass therethrough. Valve guide plates 5 are provided on the inner surface of an upper portion of the valve casing 1, projecting downwardly in four directions to surround the vent hole 3.

A vent shut-off valve 6 including a check valve 9, and a ball roll-over type valve consisting of a first valve body 7 and a second valve body 8 which interlock with each other, are received in the valve casing 1.

The vent shut-off valve 6 is in the form of a conical tube with a vertical communication hole 28 formed in the apex, and the outer surface of the conical tube is a seal surface 11 to abut against an opposite tapered valve seat 10 and to seal a gap therefrom. As shown in FIG. 1, the vent shut-off valve 6 is integrally supported on an upper portion of a valve support member 6a of a complicated shape. The valve support member 6a extends over a cylindrical portion 24a of the bottom casing. A fuel receiving portion 13 is formed on the outer periphery of the valve support member 6a. An upper portion of the valve support member 6a is decreased in diameter and shaped into a top end portion for attachment to the vent shut-off valve 6. A portion further extending from this top end portion is bent inwardly to define a communication passage 17. A valve seat 12 of the roll-over valve is formed at a bottom portion of the communication passage 17. In order to close the vent shut-off valve 6 during an engine stop, a spring 15 is provided between a top plate 24b of the bottom casing cylindrical portion 24a and the inner surface of the top end portion for attachment to the vent shut-off valve 6 so that these two members will be repulsive from each other.

Figure 9:
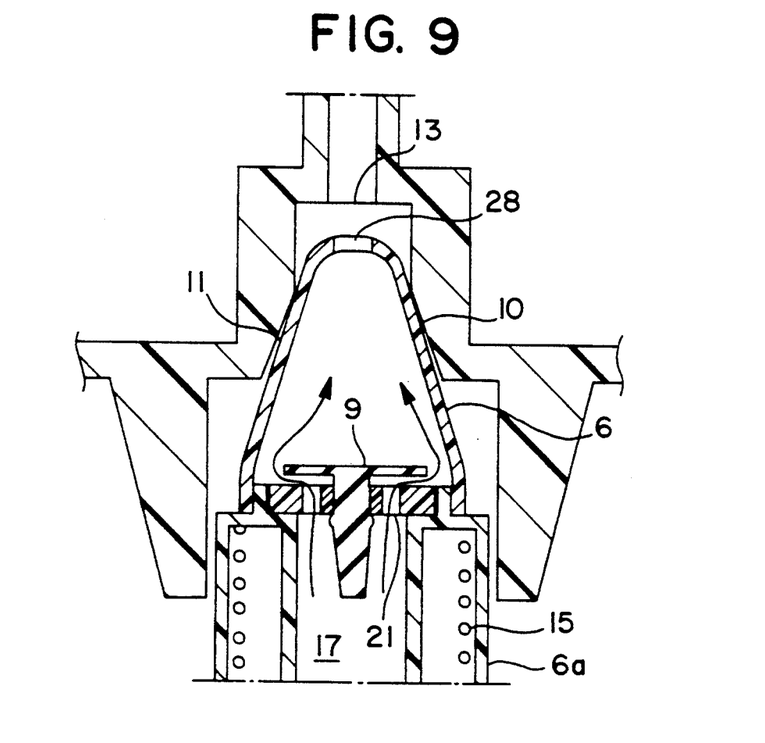
FIG. 9 is an enlarged cross-sectional view showing the roll-over valve portion in which a check valve is opened due to an increase in the tank internal pressure while the engine is stopped.

The check valve 9 is located in an inner middle portion of the vent shut-off valve 6, i.e., on the top end portion of the valve support member 6a. As shown in FIG. 9, this check valve 9 is of an umbrella-like shape to close a vent hole 21 which is formed in a middle portion of the communication passage 17 inside of the vent shut-off valve 6. When a cap of a fuel filling port is closed, the tank internal pressure is decreased due to an influence of, for example, the return fuel of a high temperature, and when this tank internal pressure exceeds a predetermined pressure of the check valve 9, as shown in FIG. 9, the check valve 9 is opened to discharge gas of the tank into the canister.

The fuel receiving portion 13 is an annular vessel, in a bottom portion of which escape holes 20 for liquid fuel are formed. These escape holes 20 are designed such that an amount of liquid fuel which returns from the engine to the fuel receiving portion 13 is larger than an amount of liquid fuel which is released from the fuel receiving portion 13 through these holes during operation of the engine.

Figure 8:
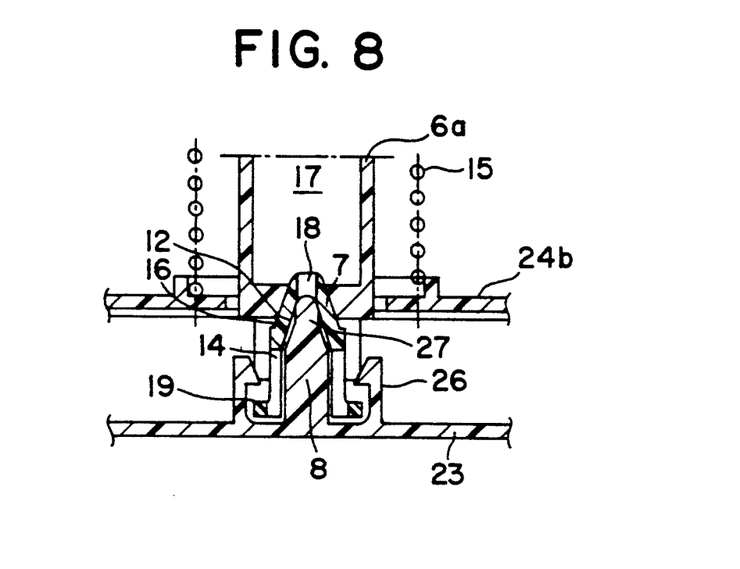
FIG. 8 is an enlarged cross-sectional view showing the roll-over valve portion in which a vertical communication hole of a first valve body is closed by a second valve body while the engine is being operated.

As shown in FIG. 8, the roll-over valve is arranged such that the second valve body 8 is covered with the first valve body 7, each of the valve bodies being of a cylindrical shape with a conical upper portion. The outer surface of the first valve body 7 is a seal surface 16 to abut against the tapered valve seat 12 provided in the communication passage 17 and to seal a gap therefrom. A slit 14 is formed in a conical side wall of the first valve body 7, and an engaging portion 19 is provided on the lowermost portion of the first valve body 7. The inner surface of the first valve body 7 is shaped into a valve seat against which a seal surface of the second valve body 8 abuts. A communication hole 18 communicating with the communication passage 17 is formed in the apex of the second valve body 8.

As shown in FIGS. 1 and 8, the second valve body 8 has a structure in which a tapered valve portion 27 and an engaging projection 26 are provided on a circular function plate 23 which moves vertically inside of the cylindrical portion 24a erected from the bottom casing 24. The valve portion 27 has an upper portion to which the second valve body 8 is connected, and the engaging projection 26 which can be engaged with the engaging portion 19 of the first valve body 7 is provided on the outer periphery of the valve portion 27. The valve portion 27 is covered with the first valve body 7, these two members being integral with each other to move relatively vertically.

For the roll-over valve, a metallic ball 22 which detects an inclination of a vehicle and changes the position is used. This ball 22 is mounted on a ball rolling base 25 of a funnel-like shape whose center is low and whose outer periphery is high. The ball rolling base 25 is attached on the bottom casing 24. A ball receiving frame 23a of a cross shape is attached to a lower portion of the circular function plate 23 as a bottom cover so that the ball 22 will not come off. Directions of movement of the circular function plate 23 is restricted only to vertical directions by sliding each end of the ball receiving frame 23a in a groove formed in an inner side wall of the cylindrical portion 24a. Thus, when the ball 22 rolls on the surface of the ball rolling base 25 and exerts a pressure on the circular function plate 23, the second valve body 8 can be moved vertically.

When the vehicle is not inclined but stays horizontal and the engine is stopped, as shown in FIG. 1, no fuel returns from the return-passage hole 4, and consequently, liquid fuel does not accumulate in the fuel receiving portion 13. Therefore, the vent shut-off valve 6 is pressed upwardly by the spring 15 so as to bring the seal surface 11 into contact with the valve seat 10, thereby closing the vent hole 3. At this time, since the tank internal pressure is not very high, the check valve 9 is closed, and the ventilation line is completely closed, so that restriction of the fuel level when the tank is full can be adequately performed.

However, both the first valve body 7 and the second valve body 8 of the roll-over valve portion are open. In consequence, if the tank internal pressure is abnormally raised while the above-mentioned ventilation line is completely closed, the tank internal pressure is exerted, through the communication passage 17, on the check valve 9 to open it and to keep the ventilation line open until the tank internal pressure is lowered to an appropriate level. Thus, breakage of the tank owing to abnormal increase of the tank internal pressure can be prevented.

Figure 6:
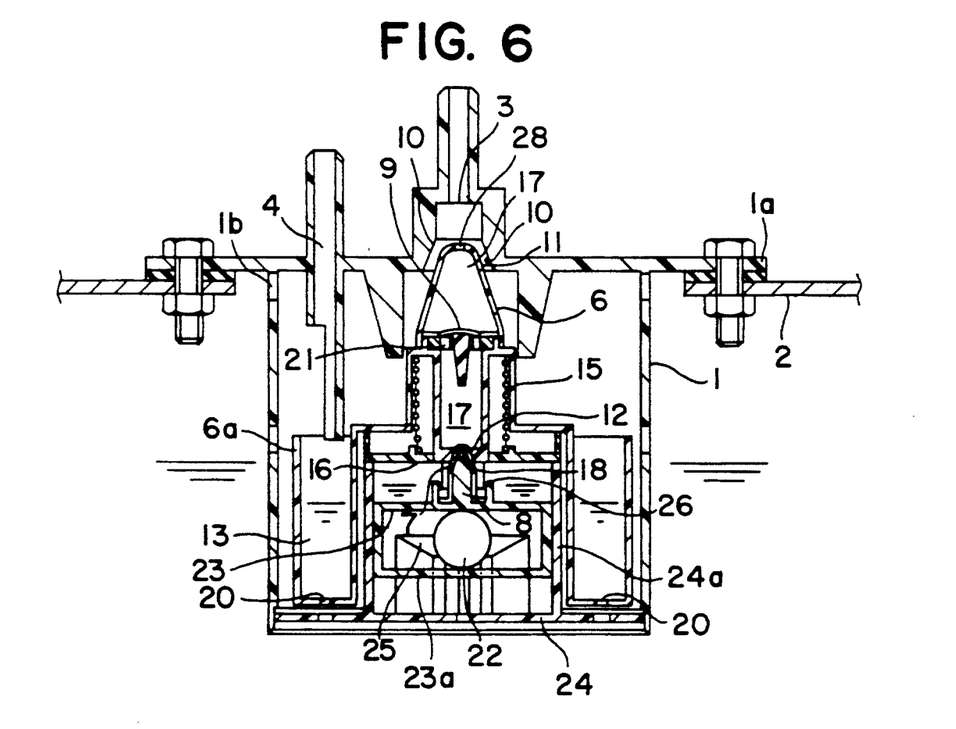
FIG. 6 is a cross-sectional view showing the ventilation line opening/closing means in which a ventilation line is open while an engine is being operated.
Figure 7:
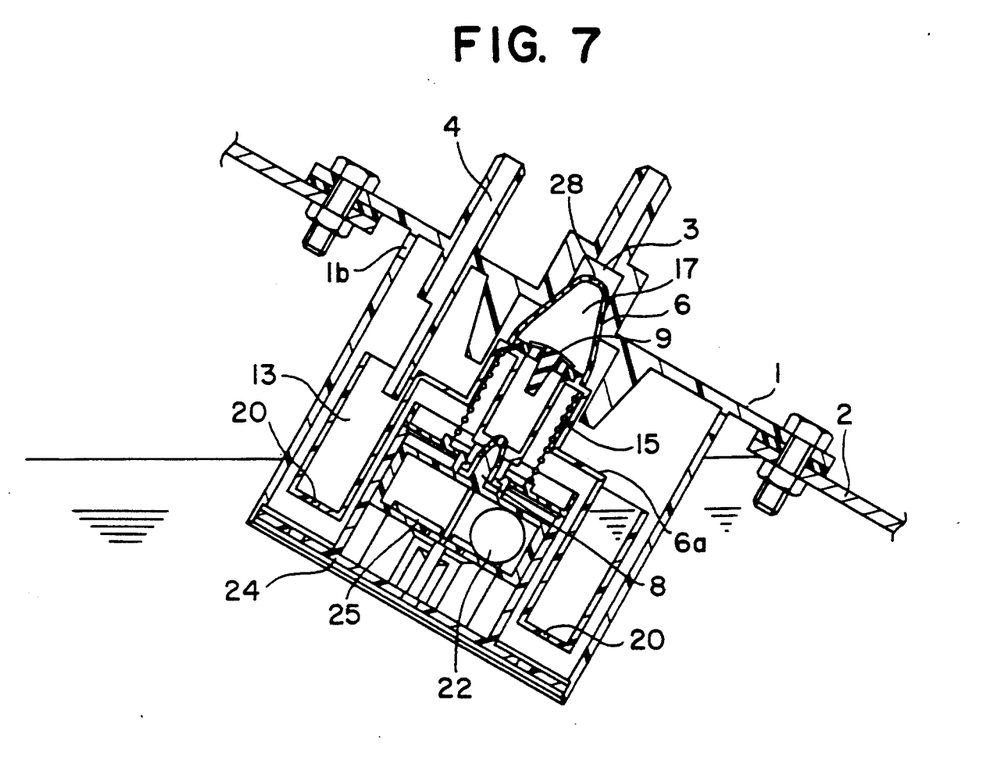
FIG. 7 is a cross-sectional view showing the ventilation line opening/closing means in which the ventilation line is closed because the surface of fuel is inclined while the engine is stopped.

When the engine is operated and the vehicle is traveling normally, as shown in FIG. 6, return fuel from the engine returns via the return-passage hole 4 and accumulates in the fuel receiving portion 13 so as to press the vent shut-off valve 6 downwardly with its weight, thereby opening the ventilation line. In this condition, if the vehicle slalom-drives or is turned over in some situation, as shown in FIG. 7, the ball 22 which has rolled on the surface of the ball rolling base 25 toward the outer periphery lifts the circular function plate 23 relatively upwardly. As a result, both the roll-over valve portion and the vent shut-off valve 6 abut against the respective valve seats and close the ventilation line, thus preventing liquid fuel from flowing back to the canister.

By the way, in the above-described embodiment, it is difficult for the umbrella-like check valve and the roll-over valve with the ball to follow up a small change because they do not respond to an outside change unless it is large to a certain degree. Besides, provision of such valves increases the dimensions of the entire means. FIGS. 10 to 14 show one embodiment of a ventilation line opening/closing means of a double-float type according to the present invention, which includes a roll-over type valve with a float in order to make the means compact and to improve the responsiveness. The structure of this means will now be described while referring to operational points of the roll-over valve with the float to which attentions must be paid.

Figure 10:
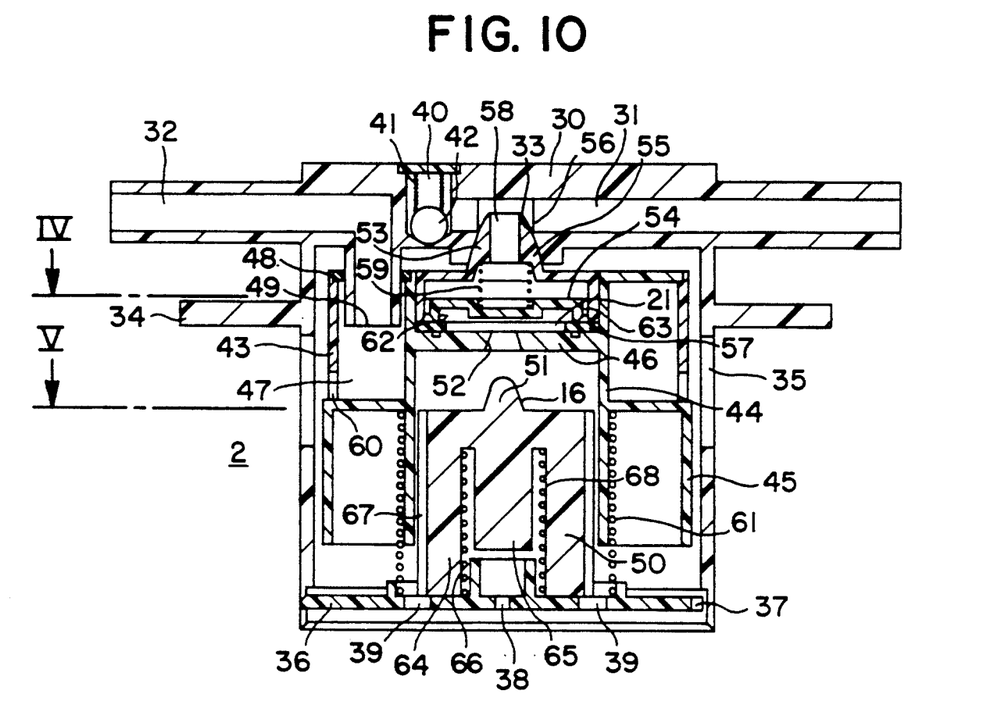
FIG. 10 is a cross-sectional view showing a ventilation line opening/closing means in this embodiment.
Figure 11:
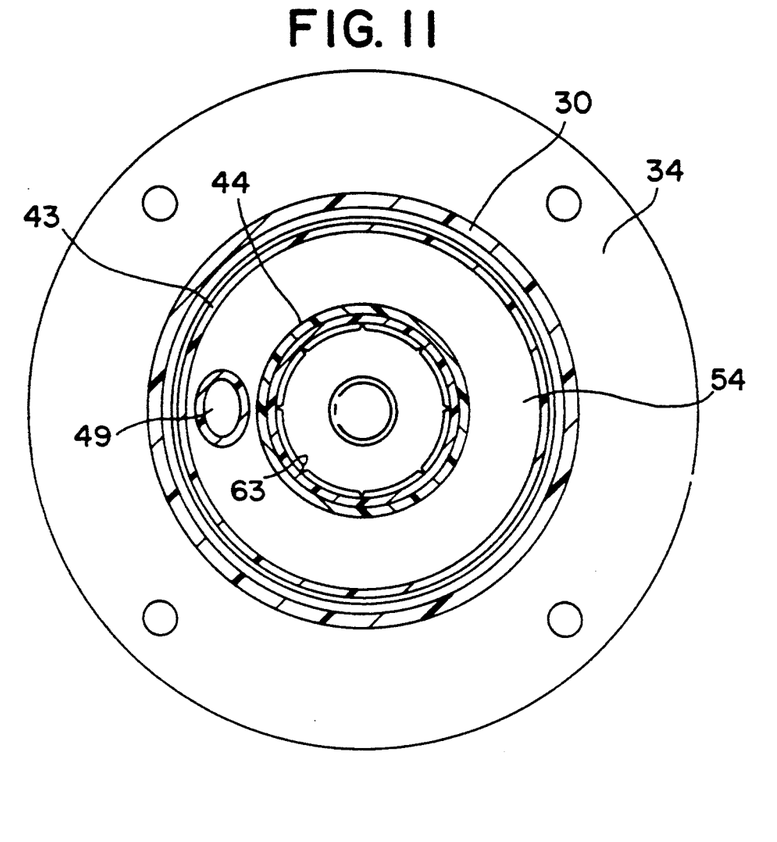
FIG. 11 is a cross-sectional view taken along the line IV—IV in FIG. 10.
Figure 12:
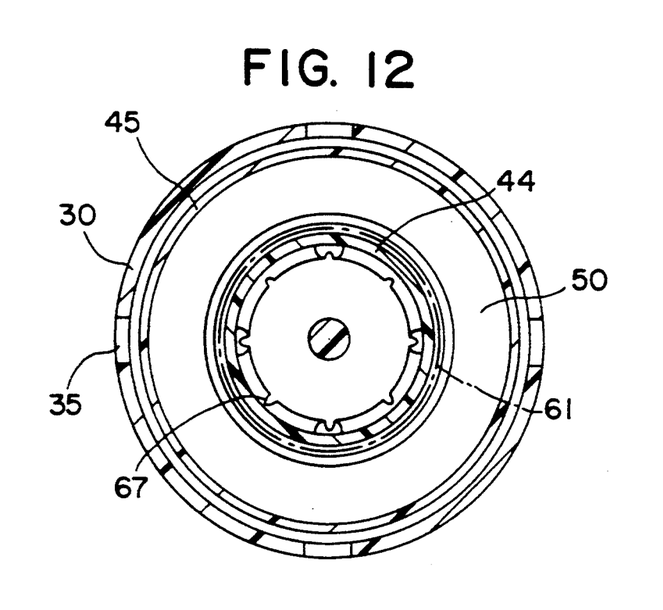
FIG. 12 is a cross-sectional view taken along the line V—V in FIG. 10.

As shown in FIGS. 10 to 12, a valve casing 30 is of a cylindrical shape such that it is attached to an upper portion of a fuel tank 2 through a flange 34. A ventilation line extends horizontally in an upper portion of the valve casing 30, so that a vent hole 31 communicates with the inside of the valve casing 30, and that a return-passage hole 32 communicates with the outer periphery of the upper portion of the valve casing. A vent hole 35 is formed in a side wall of the valve casing 30. A disk-like bottom casing 36 is attached to the bottom surface of the valve casing 30, with gaps 37 being defined in three positions on the outer periphery of the bottom casing 36. This bottom casing 36 further includes a fuel discharge hole 38 formed in the center and four fuel circulation holes 39 formed around the fuel discharge hole 38. The gaps 37 and the fuel discharge hole 38 are provided for quickly discharging liquid fuel from the inside of the valve casing 30 in order to function the float valve body. On the other hand, the fuel circulation holes 39 not only function in substantially the same manner as this but also serve to introduce the liquid fuel into the valve casing 30 so as to function the float valve body.

A relief valve 40 is provided in an upper portion of the valve casing 30. The relief valve 40 prevents a difference between inside and outside pressures of the tank from increasing to suppress the movement of a float valve 50. The relief valve 40 contains, as a valve, a ball 42 which is slightly pressed by a spring 41. If a pressure higher than a predetermined level is exerted on the ball 42, it is moved to open the valve. A portion of a side wall of the relief valve 40 communicates with the vent hole 31.

As shown in FIG. 10, a valve support member 43 of a cylindrical shape having a side wall of a double structure is vertically movably provided in the valve casing 30. A cylindrical portion of an inner shell 44 is divided into upper and lower sections by a partition 46 having a valve seat 52 of the float valve 50 formed in the center, these upper and lower sections being open upwardly and downwardly, respectively. A fuel receiving portion 47 is formed between the inner shell 44 and an outer shell 45, and an upper portion 48 of the fuel receiving portion 47 is closely sealed except for communication with the return-passage hole 32. Thus, liquid fuel will not accidentally splash to the vent hole 31 owing to a relative increase in an inflow amount of return fuel in accordance with downsizing of the means. As shown in FIG. 11, the return-passage hole 32 is also designed such that an opening 49 is enlarged downwardly, to thereby prevent splash of the liquid fuel. An escape hole 60 communicating with the valve casing 30 is formed in the outer shell 45 on a lower part of the fuel receiving portion 47. A spring 61 is provided around the outer side surface of the inner shell 44 of the valve support member 43 so that the valve support member and the bottom casing 36 will be repulsive from each other.

A vent shut-off valve 53, a check valve 54 and the float valve 50 are of circular or cylindrical shapes, and are operated in the inner shell 44 of the valve support member 43. The vent hole 31 tapered to be enlarged downwardly is opened in an upper portion of the valve casing 30 which is coaxial with these valves. The vent shut-off valve 53 includes a conical projecting portion 55 having a seal surface 56 which abuts against the tapered surface of the vent hole 31. The conical projecting portion 55 is formed in the center of a facing-down cover in sliding contact with the inner side surface of the inner shell 44 of the valve support member 43. The vent shut-off valve 53 is integral with the valve support member 43 with a doughnut-like packing 57 being interposed between the vent shut-off valve and the contacted partition 46. A large-diameter vertical communication hole 58 is formed in the conical projecting portion 55 in order to moderate the difference between inside and outside pressures of the tank easily.

The disk-like check valve 54 is received in the space defined by the vent shut-off valve 53 and the partition 46, and a spring 59 is provided between the vent shut-off valve 53 and the check valve 54 so that these two members will be repulsive from each other. Consequently, the check valve 54 is usually pressed downwardly so that a ring 62 formed on the outer periphery of the lower surface of the check valve 54 is closely contacted with the packing 57, thereby obtaining sealing closeness when the ventilation line is closed. Further, in order to raise the responding speed of the check valve 54, an area of the sliding contact between the inner side surface of the vent shut-off valve 53 and the outer side surface of the check valve 54 is decreased by forming eight thin ribs 63 vertically on the outer side surface of the check valve 54 at the same intervals, as shown in FIG. 11.

The float valve 50 is an integral molding of a structure in which an axial rod 65 having a diameter smaller than an inner diameter of a hollow portion of a thick cylinder 64 is fixed in the cylinder 64 opened downwardly. A valve portion 51 having a substantially conical cross-sectional configuration is provided in the center of the upper surface of the float valve 50 so as to project upwardly. This valve portion 51 serves as a valve corresponding to a valve seat 52. A spring 66, which is attached to the bottom casing 36 so that the float valve and the bottom casing are repulsive from each other, is provided to be internally contacted with a side surface 68 of the above-mentioned cylinder. Usually, the float valve 50 is lowered by its own weight, withstanding the force of the spring 66. However, when the vehicle receives a shock or the like, the pressure of liquid fuel from the fuel circulation holes 39 and this spring 66 quickly raise the float valve 50, to thereby close the ventilation line. As shown in FIG. 12, eight thick ribs 67 are formed vertically on the outer side surface of the float valve 50 in order to steady the course of vertical movement of the float valve 50.

When the vehicle is not inclined but stays horizontal and the engine is stopped, as shown in FIG. 10, no fuel returns from the return-passage hole 32, and the fuel receiving portion 47 is empty. Therefore, the valve support member 43 is pressed upwardly by the spring 61 so as to close the vent shut-off valve 53, thus closing the vent hole 31. At this time, since the tank internal pressure is not very high, the check valve 54 is closed, and consequently, the ventilation line is completely closed, so that the fuel level restriction can be adequately performed.

However, the float valve 50 is open with its bottom surface abutting against the bottom casing 36. In consequence, if the tank internal pressure is abnormally raised while the above-mentioned ventilation line is completely closed, the tank internal pressure directly presses the check valve 54 open, and the ventilation line is kept open until the tank internal pressure is lowered to an appropriate level. Thus, breakage of the tank owing to abnormal increase of the tank internal pressure can be prevented. Moreover, if the function of the float valve 50 is hindered by an increase in the tank internal pressure, the relief valve 40 is operated to lower the passage resistance with respect to the ventilation line to a further degree, so that the tank internal pressure can be controlled without hindering the operation of the float valve 50.

Figure 13:
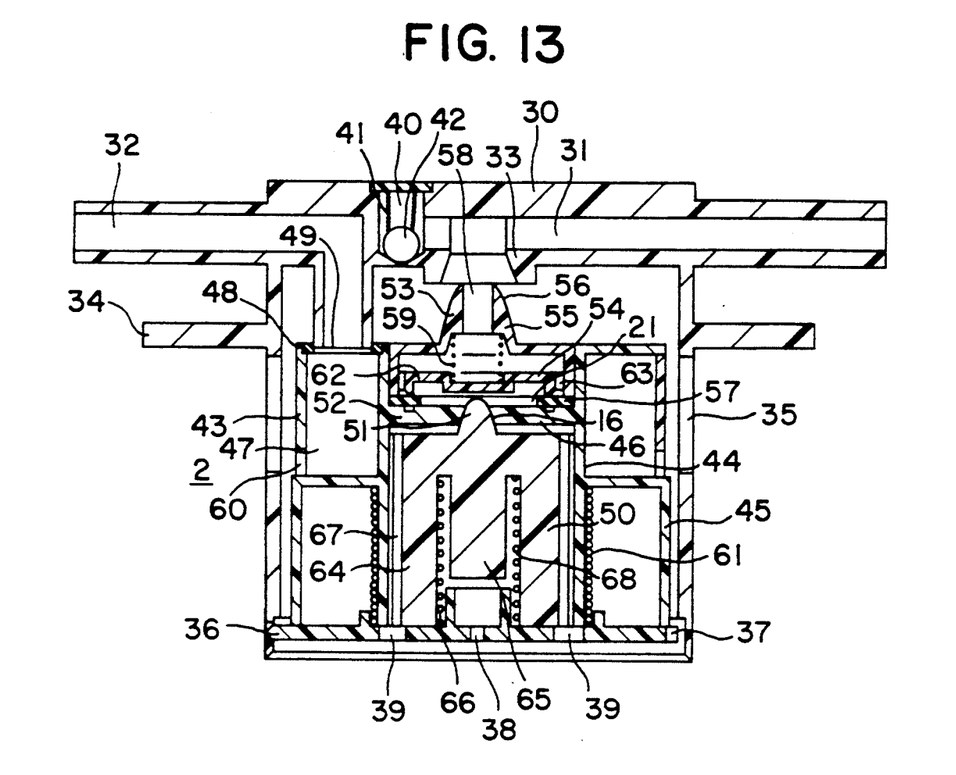
FIG. 13 is a cross-sectional view showing the ventilation line opening/closing means in which a ventilation line is open while an engine is being operated.
Figure 14:
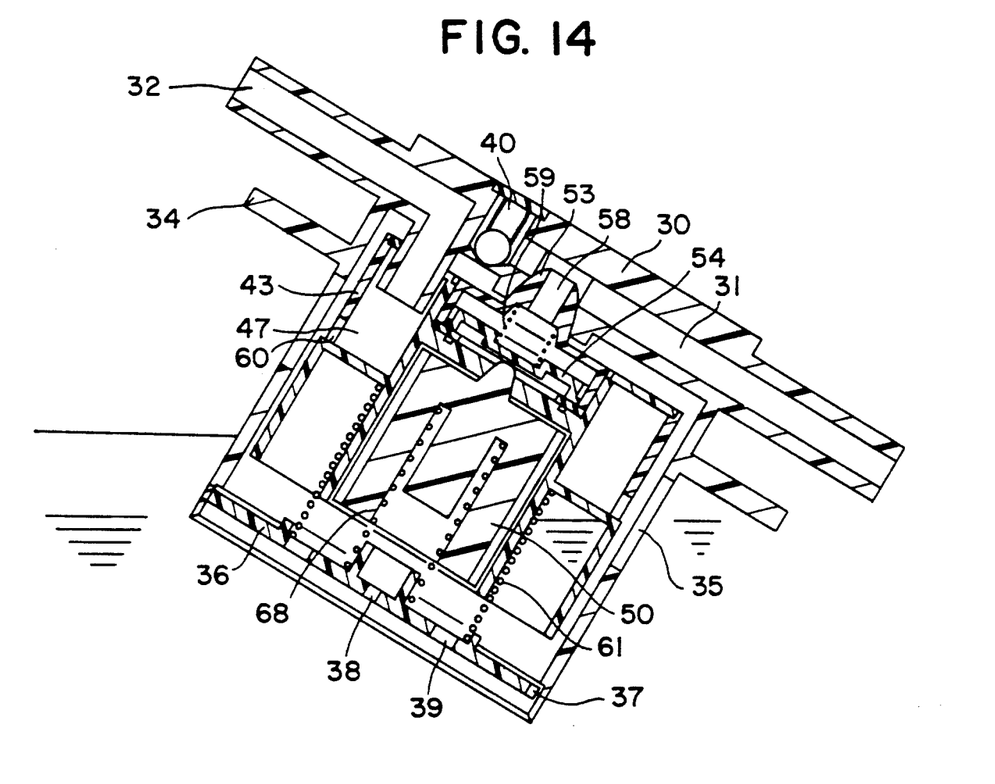
FIG. 14 is a cross-sectional view showing the ventilation line opening/closing means in which the ventilation line is closed when a vehicle is turned over while the engine is being operated.

When the engine is operated and the vehicle is traveling normally, as shown in FIG. 13, return fuel from the engine returns via the return-passage hole 32 and accumulates in the fuel receiving portion 47 so as to press the vent shut-off valve 53 downwardly with its weight, thereby opening the ventilation line. In this condition, if the vehicle slalom-drives or is turned over in some situation, as shown in FIG. 14, the float valve 50, which has pressed the spring 66 by its weight during stable operation, is lifted not only by the force of the spring 66 but also by buoyancy produced by liquid fuel which has flowed in through the fuel circulation holes 39 in response to a shock when the vehicle is turned over. Then, the float valve 50 is brought into close contact with the valve seat 52, and the roll-over valve is closed, to thereby prevent liquid fuel from flowing back to the canister unnecessarily. At this time, if the tank internal pressure is increased, the tank may be broken, and also, the operation of the float valve 50 may be hindered from returning. Therefore, the relief valve 40 is operated to decrease the tank internal pressure.

With the above-described function, the ventilation line to the canister is interrupted during fuel supply so as to restrict the fuel level when the tank is full, and an increase of the tank internal pressure due to vaporization of fuel is suppressed during traveling of the vehicle, thereby effectively preventing diffusion of vaporized fuel into the atmosphere.

What is claimed is:

1. A ventilation line opening/closing means of a fuel tank, comprising a float valve provided in a ventilation line for introducing gas of the fuel tank into a canister so as to control ventilation, wherein a spring is provided to close a vent shut-off valve during a stop of an engine, and a fuel receiving portion including escape holes in the bottom is formed in a float which is integral with the vent shut-off valve so that return fuel from the engine is introduced into the fuel receiving portion during operation of the engine, thereby opening the vent shut-off valve, withstanding the force of said spring.

2. A ventilation line opening/closing means of a fuel tank according to claim 1, wherein the float valve body comprises a seal surface which abuts against a valve seat of a valve casing, said seal surface being an outer surface of an upper portion of the vent shut-off valve in the form of a conical tube, a check valve provided inside of the conical tube of the vent shut-off valve, and a vertical communication hole formed in the axial center of the conical tube.

3. A ventilation line opening/closing means of a fuel tank according to claim 1, wherein the float valve body is designed such that a valve seat is provided on that side of a check valve which is far from the outer surface of the vent shut-off valve in the form of a conical tube, and a roll-over type valve which abuts against the valve seat to constitute a valve portion is provided below the valve seat.

* * * * *